(Model.)
P. SHIPLEY.
STALK CUTTER.
No. 269,544. Patented Dec. 26, 1882.
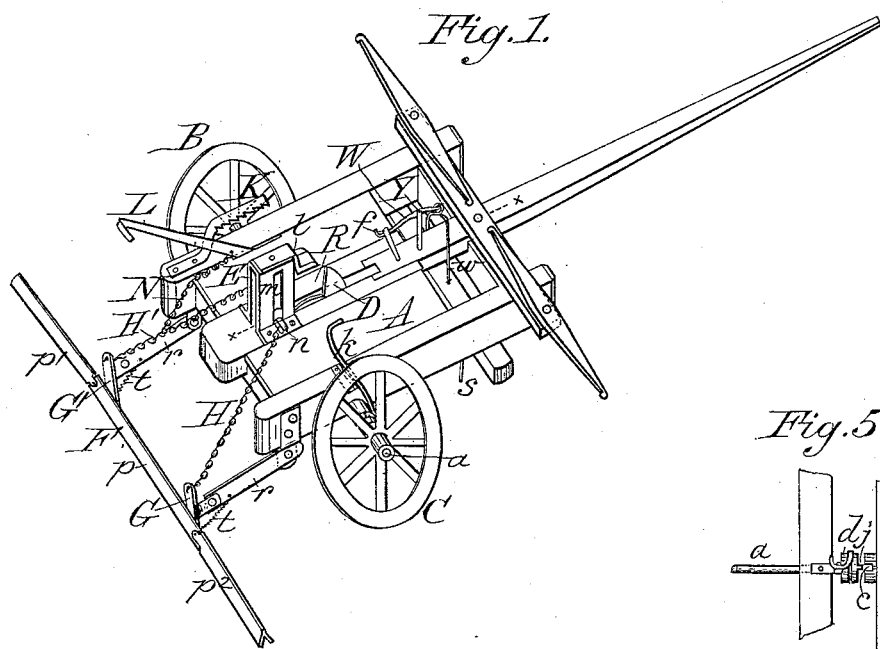
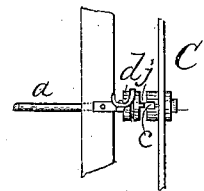
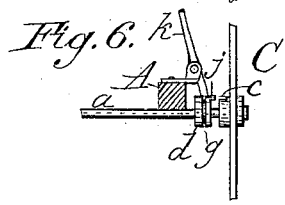
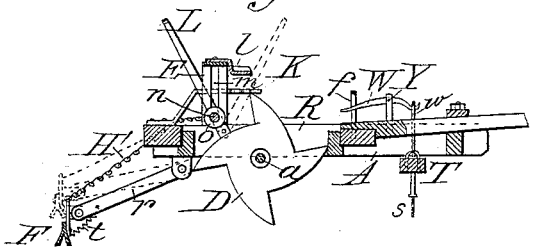
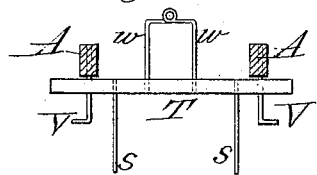
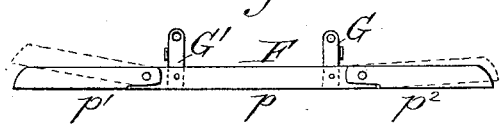
Attest:
F. H. Schott.
N. R. Brown.
Inventor:
Peter Shipley
(for J. C. Tasker)

UNITED STATES PATENT OFFICE.

PETER SHIPLEY, OF RED OAK, IOWA.

STALK-CUTTER.

SPECIFICATION forming part of Letters Patent No. 269,544, dated December 26, 1882.

Application filed August 2, 1881. (Model.)

*To all whom it may concern:*

Be it known that I, PETER SHIPLEY, a citizen of the United States, residing at Red Oak, in the county of Montgomery and State of Iowa, have invented certain new and useful Improvements in Stalk-Cutters, of which the following is a specification.

The object of this invention is to provide an improved stalk-cutter capable of cutting one, two, or more rows, as may be desired; and the invention consists in the construction and arrangement of parts, as hereinafter more fully described and claimed.

In the annexed drawings, illustrating my invention, Figure 1 is a perspective view of my machine. Fig. 2 is a section of the same on the line $x\ x$ of Fig. 1. Fig. 3 is a rear view of a single-blade knife, showing adjustable sections or parts. Fig. 4 is a bottom view of a double-bladed knife, having adjustable sections. Fig. 5 is a top view of the clutch mechanism. Fig. 6 is a front view of the same, and Fig. 7 is a front view of the brace and hooks for straightening the stalks.

Similar letters refer to similar parts throughout the several views.

A represents the body or frame of my stalk-cutter, which is provided with the ordinary pole and draft attachments. In the center of the frame A is a slot, R, in which the cam D plays, the teeth of the cam extending above the floor of the frame.

$a$ is an axle journaled in bearings, secured to the bottom of the frame A, so that it can revolve with the wheels B and C when in clutch therewith. This axle is provided with a cam, D, and clutch $d$. The wheels B and C are loosely attached to the axle, so as to revolve without turning the same, except when one or both wheels are in clutch with the axle for the purpose of operating the cam. This clutch mechanism is shown as arranged in connection with the wheel C, the inside hub of which has notches $c\ c$ for the reception of the teeth $j$ of the sliding clutch $d$, which holds the wheel C firm, and causes it to revolve with the axle. The clutch $d$ has a groove, $g$, in which the forked end of the lever $k$ rests and moves the clutch to and fro. The cam D, having teeth made in the shape shown in Fig. 2, is rigidly attached to the axle, revolving with it, and raises the mechanism by which the knives are caused to rise and fall at regular intervals.

E is a frame placed over the cam, and having a seat, $l$, for the operator. This frame is secured to the body-frame in any appropriate manner, and has on each side vertical slots $m\ m$, in which the bar $n$ moves. This bar, when actuated by the cam D, moves up and down in the slots $m\ m$. O is a small roller, loosely attached to bar $n$, and revolved by cam D.

F is a knife made of double blades, as shown in Fig. 4, or in a single blade, as shown in Fig. 3, and divided into three parts or sections, $p\ p'\ p^2$, said sections being pivoted to each other, thus allowing the use of one or all of them, as may be desired.

G G' are lugs which are rigidly attached at one end to the center section of the knife F, and loosely secured at the other end to arms $r\ r$, projecting at the rear end of the body-frame A. The lugs G G' are so hung on the arms $r\ r$ that they will swing up and down. $t\ t$ are small spiral springs, connected at one end to the knife F and at the other end to the arms $r\ r$. They prevent the knife from catching and dragging on the earth, and at the same time bring it back to position when raised by the cam. These springs may be of any desired number.

H H' are chains secured at one end to the lugs G G' and at the other to the ends of the bar $n$, which is raised and lowered by the cam. When the bar is raised the chains will raise the knife. I have only shown the chains connected to the middle section, $p$; but each section may have them, if desired.

K is a ratchet-arm on the side of the frame A adjacent to the wheel B. Its teeth are adapted to hold the lever-pawl L, which is connected with the knife by a chain, N, and thus serves to keep the knife raised in any desired position and hold it up when not in use.

T is a brace arranged transversely underneath the forward end of the body-frame A, and is loosely hung on arms V V, which extend down from the bottom of the body. This brace is so arranged as to be capable of being moved up and down on the arms V V. It is also attached to a bent lever, W, by rods $w\ w$.

On the bottom of the brace T are teeth or hooks s s for straightening the stalks in the rows. These teeth or hooks may be of any suitable number. The brace T may also be made in adjustable sections, so that it can work on one, two, or three rows, as may be desired. The lever W works on a fulcrum, Y, secured to the body-frame A, or to the pole, and has at one end a foot-rest, its other end being attached to the rods w w, by which it is connected with the brace T.

f is a catch to hold the lever W in position. This lever W is operated by the foot of the driver.

When the wheel C is in clutch with the axle, if the machine is moved forward, the axle will turn, carrying the cam D, which raises the bar n and the knife F at intervals, according to the number of teeth on the cam. By the force of gravitation the knife falls backward and the stalks are cut to the length of about one foot.

In order to facilitate turning the machine, the wheel C is made loose on the axle, so that by moving back the clutch d by means of the lever k it will revolve on the axle without rotating the same. After the machine has been turned the wheel C is brought into action again by simply moving the clutch back. Should the operator not wish to use the knife, it can be raised and held by means of the pawl-lever L. The brace T is raised by the lever W when turning or when not in use.

All the several parts of my machine are made of any suitable material, and are adjusted for one, two, or three rows of stalks, as may be desired.

Having thus described my invention, what I claim as new, and desire to secure by Letters Patent, is—

1. In a stalk-cutter, the single or double bladed knife or knives F with adjustable sections $p$ $p'$ $p^2$, substantially as shown and described.

2. In a stalk-cutter, the brace T, having teeth or hooks s s, in combination with the lever W and catch f, as shown and described.

3. In a stalk-cutter, the combination of the slotted frames A and E, axle a, having wheels B C and cam D, the knife or knives F, having a pivoted connection with the main frame by means of the lugs G G' and arms r r, the vertically-sliding bar n, arranged in the slotted frame E, and carrying a roller, O, and the chains H H', connecting said bar with the knives, all substantially as and for purpose described.

PETER SHIPLEY.

Witnesses:
J. M. JUNKIN,
H. E. DEEMER.